United States Patent [19]

Stauffer et al.

[11] Patent Number: 5,671,443

[45] Date of Patent: Sep. 23, 1997

[54] DIRECT MEMORY ACCESS ACCELERATION DEVICE FOR USE IN A DATA PROCESSING SYSTEM

[75] Inventors: David Robert Stauffer, Milton, Vt.; Rebecca Stempski McMahon, San Jose, Calif.

[73] Assignee: International Business Machines Corporation, Armonk, N.Y.

[21] Appl. No.: 391,810

[22] Filed: Feb. 21, 1995

[51] Int. Cl.⁶ ...................................................... G06F 13/36
[52] U.S. Cl. ........................... 395/845; 395/309; 395/848
[58] Field of Search ...................................... 395/309, 287, 395/842, 843, 845, 846, 848, 873, 880

[56] References Cited

U.S. PATENT DOCUMENTS

| | | | |
|---|---|---|---|
| 4,247,893 | 1/1981 | Anderson et al. | 395/309 |
| 4,271,466 | 6/1981 | Yamamoto et al. | 395/850 |
| 4,344,130 | 8/1982 | Fung et al. | 395/200.01 |
| 4,475,155 | 10/1984 | Oishi et al. | 395/842 |
| 4,831,523 | 5/1989 | Lewis et al. | 395/848 |
| 5,109,501 | 4/1992 | Kaneko et al. | 395/846 |
| 5,119,487 | 6/1992 | Taniai et al. | 395/842 |
| 5,179,709 | 1/1993 | Bailey et al. | 395/843 |
| 5,182,800 | 1/1993 | Farrell et al. | 395/844 |
| 5,283,883 | 2/1994 | Mishler | 395/842 X |
| 5,287,457 | 2/1994 | Arimilli et al. | 395/308 |
| 5,414,815 | 5/1995 | Schwede | 395/846 |

*Primary Examiner*—Glenn A. Auve
*Attorney, Agent, or Firm*—George E. Grosser

[57] ABSTRACT

A Direct Memory Access (DMA) Acceleration Device for substantially increasing a data transfer rate between a system memory and an Input/Output (I/O) device for use in a data processing system. The DMA Acceleration Device enables the system to subtantially double a data transfer rate between the system memory and the I/O device by generating necessary control and address signals. In a receive operation, the DMA Acceleration Device reads the data from the I/O device while the host processor simultaneously writes the previous data to the system memory. Similarly, in a transmit operation, the DMA Acceleration Device writes the data to the I/O device while the host processor simultaneously reads the subsequent data from the system memory. Transmit and Receive State Machines of the DMA Acceleration Device are programmed to control the sequencing of signals during the DMA mode, while being absolutely transparent to the system in a non-DMA mode of operation.

9 Claims, 8 Drawing Sheets

DIRECT MEMORY ACCESS ACCELERATION DEVICE FOR USE IN A DATA PROCESSING SYSTEM

FIELD OF THE INVENTION

The invention broadly relates to data processing systems, and more particularly relates to an acceleration device for increasing a data transfer rate between a peripheral device and a system memory.

BACKGROUND OF THE INVENTION

In data processing systems, efficient transfers of data between a peripheral device and a system memory are of paramount concern. In a typical system, a Direct Memory Access (DMA) controller controls DMA operations. Practically every bus architecture implements DMA operations using a DMA controller in combination with either a DMA Slave or a DMA Master device. Examples of such architectures are PC/AT bus, Enhanced Industry Standard Architecture (EISA), Personal Computer Memory Card Industry Association (PCMCIA), Microchannel, Video Electronics Standards Association (VESA), Peripheral Component Interconnect (PCI), symmetrical and distributed multiprocessors with common communications medium, and other bus architectures using bus arbitration schemes.

In a DMA Slave configuration, an Input/Output (I/O) adapter functioning as a DMA Slave device can neither perform bus arbitration nor drive control signals onto the system bus. Consequently, the I/O adapter relies on a system DMA controller to drive the address and control information onto the bus, and to control the number of bytes during the transfer. The advantage of the DMA Slave implementation resides in the minimal amount of hardware necessary for performance of DMA operations on the bus. This low cost approach, however, is accompanied by a speed penalty in these bus architectures, because the system DMA controller cannot access the system memory and the I/O adapter simultaneously. As the result, the system DMA controller must use two bus cycles per transfer, as it reads from the I/O adapter and writes to the system memory, or vice versa, using separate bus cycles. This limitation doubles the amount of time required to perform the DMA transfer, as compared to DMA Master implementation.

An alternative to the DMA Slave is an I/O adapter functioning as a DMA Master device, which provides additional hardware beyond the DMA Slave configuration. In the DMA Master implementation, during a DMA operation, the I/O adapter itself drives address and control information onto the bus, as well as controls the number of bytes during the transfer. The I/O adapter accesses a system memory directly using a single bus cycle rather than using the system DMA controller as an intermediary agent. While the DMA Master implementation is more costly than the DMA Slave counterpart, only one bus cycle is required per DMA transfer, reducing the transfer time by one-half.

Due to significant differences in price and complexity between the DMA Master and Slave implementations, many commercially available I/O adapters use the DMA Slave configuration. As described above, this configuration may entail a significant performance disadvantage as a read from the I/O adapter and a write to the system memory, or vice versa, must be done consecutively in these systems. If the system requires higher performance, then one must redesign the DMA Slave portion of the I/O adapter, requiring extensive hardware and software effort. Therefore, a simple cost effective way is required to quickly and efficiently redesign an existing system without significant modifications to the hardware and software design.

The need for a device exists which would supply the additional functionality of a DMA Master device without requiring the complex redesign of hardware or substantial software modifications. This device would reduce the cost of upgrading the system, eliminate considerable additional hardware and software changes and increase data transfer rate by a factor of two.

SUMMARY OF THE INVENTION

The DMA Acceleration Device is described for a data processing system which increases the speed of data transfers between the system memory and an I/O device. The data processing system includes a system bus for transferring signals within the data processing system. Coupled to the system bus are a host processor for executing a sequence of stored program instructions, a system memory for storing program instructions and data, and an input/output (I/O) device for transferring information to and from the data processing system. In accordance with the invention, the DMA Acceleration Device is coupled between the I/O device and the system bus for providing a first data transfer control signal to the I/O device to exchange a first portion of a data unit while simultaneously providing a second data transfer control signal to the system memory to exchange a second portion of data unit. By overlapping the first and second data transfers, the overall speed of the transfer operation is increased.

In one embodiment of the invention, the DMA Acceleration Device includes an address counter for maintaining an address of a system memory and a byte counter for counting the number of bytes to be transferred during the direct access memory operation. The DMA Acceleration Device further includes an address decode circuit for decoding control signals in order to select the I/O adapter for the direct memory access operation; receive and transmit state machines for generating the control signals during the direct memory access operation; and a control/status register for enabling the receive and transmit state machines in response to a request by the host processor. The DMA Acceleration Device also includes a multiplexer for selecting various control signals to the I/O adapter; a register for holding a bus identification number assigned to the I/O adapter; an arbitration decode circuit for comparing the bus identification number with a number received from the system bus; and data storage means for providing temporal delay to stabilize data in response to the control signals from the receive and transmit state machines.

According to this embodiment, the DMA Acceleration Device is coupled between the Microchannel system bus and the I/O adapter configured as a DMA Slave. By overlapping reading and writing operations between the system memory and the I/O adapter, the data transfer rate is achieved which is substantially equal to the transfer rate in a DMA Master configuration.

DESCRIPTION OF THE PREFERRED EMBODIMENT

Figure 1A:
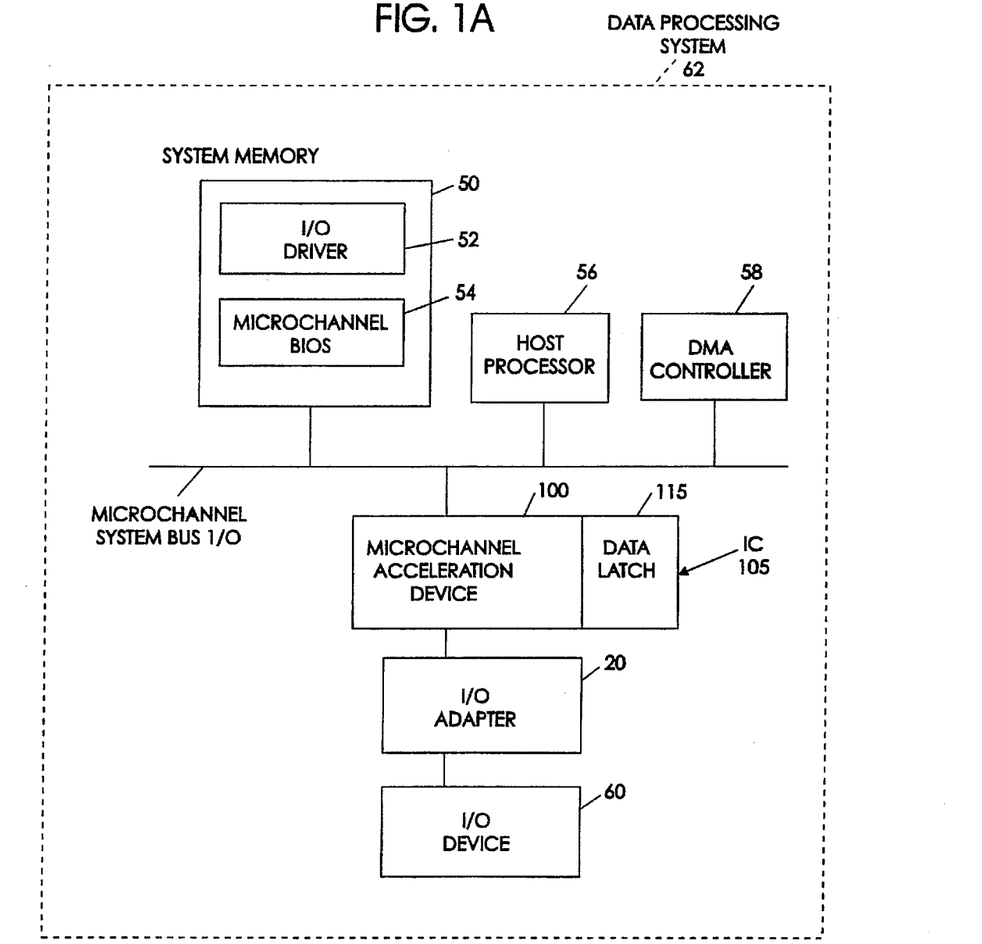
FIG. 1A is an architectural diagram of a data processing system based on the Microchannel bus configuration.

In one embodiment of the invention, FIG. 1A illustrates a Data Processing System 62 based on the Microchannel bus configuration. The Data Processing System 62 includes a Microchannel system bus 10 for transferring signals within the Data Processing System 62. Coupled to the Microchannel system bus 10 are a Host Processor 56 for executing a sequence of stored program instructions, a System Memory 50 comprising an I/O Driver 52 and a Microchannel BIOS 54 for storing program instructions and data, and an I/O Device 60 connected to an I/O Adapter 20 for transferring information to and from the Data Processing System 62. The I/O Device 60 may include such means as a printer, modem, tape or disk drive, network server, keyboard, mouse or other graphical input and output devices.

In accordance with the invention, the Integrated Circuit (IC) 105, comprising the DMA Acceleration Device 100 and the Data Latch 115, is coupled between the I/O Device 60 via the I/O Adapter 20 and the Microchannel system bus 10 for transferring data between the System Memory 50 and the I/O Device 60. The IC 105 provides a first data transfer control signal to the I/O Device 60 to exchange a first portion of a data unit while simultaneously providing a second data transfer control signal to the System Memory 50 to exchange a second portion of data unit. By overlapping the first and second data transfers, the overall speed of the transfer operation is increased.

Also shown is a Direct Memory Access (DMA) Controller 58 coupled to the Microchannel system bus 10, which along with the Host Processor 56, may control an exchange of information between the System Memory 50 and the I/O Device 60.

In reference to FIG. 1B–6, all signals preceded by a minus sign are active low, while those that do not contain a minus sign are active high. In addition, the Microchannel BIOS 54, as shown in FIG. 1A, is a sequence of programmed instructions which will carry out the methods of the Microchannel architecture when executed by a processor, such as the Host Processor 56 or the DMA Controller 58. Reference can be made to the *IBM Micro Channel Architecture Technical Reference Supplement*(S15F2160); *IBM PS/2 BIOS Interface Technical Reference Manual* (S68X-2341) *and Supplement* (S15F2161); Dutton, Harry J. R. 1990, *A Plain Man's View of the IBM Micro Channel*, Boca Raton, FL, IBM (GG24-3584-00); and Bowlds, Pat A., *Micro Channel Architecture: Revolution in Personal Computing*, New York, Van Nostrand Reinhold, 1991, for further detailed description of the operation of Microchannel architecture and the Microchannel BIOS 54. Hereinafter, when the phrase "Microchannel BIOS" is used, it is intended to mean the method performed by the Microchannel BIOS 54, when its sequence of programmed instructions are executed by a processor, such as the Host Processor 56 or the DMA Controller 58, including any hardware-driven action resulting from this instruction execution, if applicable.

Figure 1B:
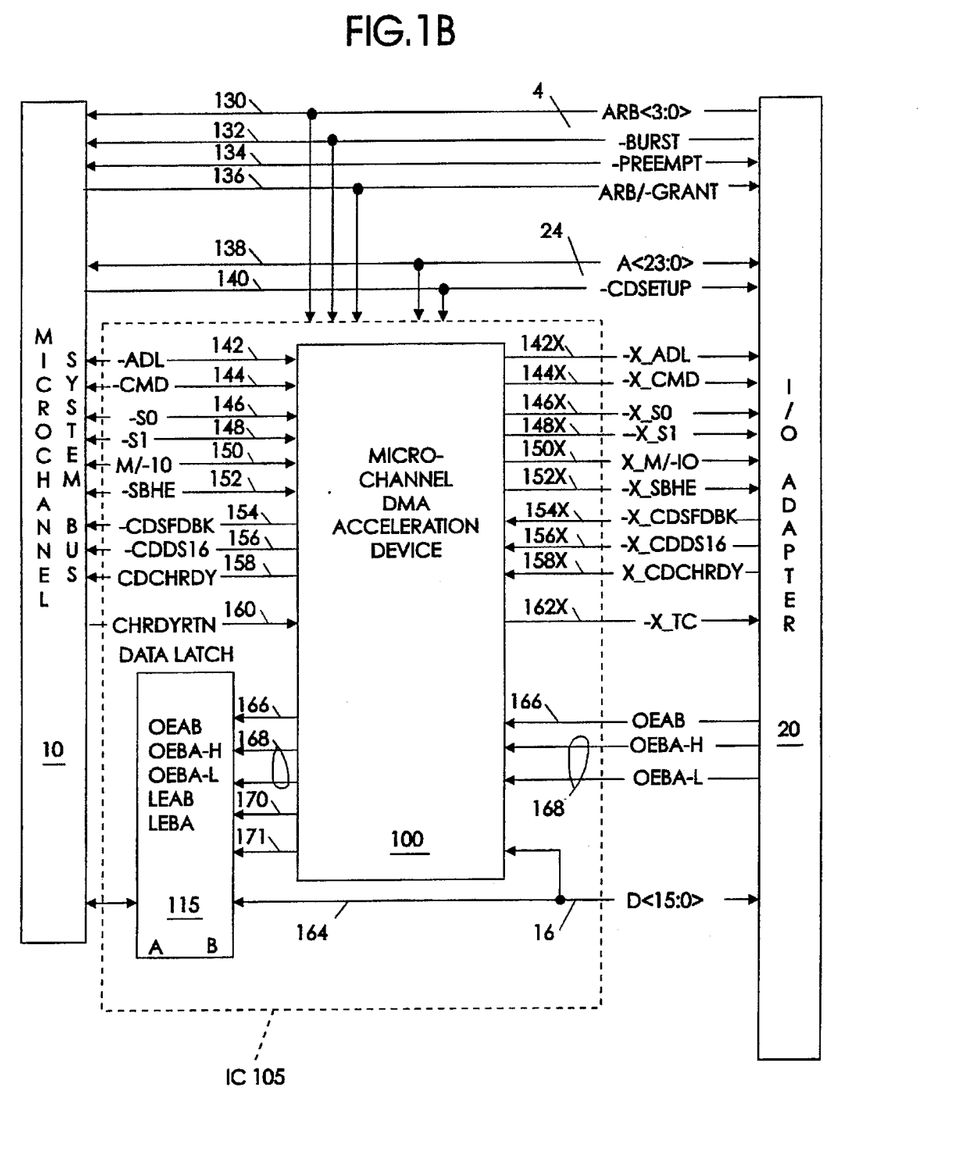
FIG. 1B is an overall functional block diagram of a data communications system with the DMA Acceleration Device in the Microchannel bus configuration.

FIG. 1B more particularly shows the previous embodiment of the invention, illustrating the DMA Acceleration Device 100 in a typical system configuration using Microchannel bus architecture. The DMA Acceleration Device 100 is inserted between the Microchannel system bus 10 and the I/O Adapter 20. The bidirectional Data Latch 115 is data storage means for buffering and driving the data between the System Memory 50 and the I/O Adapter 20 in either direction depending on the system operation. The Data Latch 115 provides temporal delay for data stabilization in response to the control signals from the DMA Acceleration Device 100 and the I/O Adapter 20.

Referring to FIG. 1B, the I/O Adapter 20 asserts the signal -PREEMPT 134 in order to request an arbitration cycle. In response, the Microchannel BIOS 54 asserts the signal ARB/-GRANT 136 on the Microchannel system bus 10 to control the occurrence of an arbitration cycle and grant bus ownership. The I/O Adapter 20 generates and monitors the arbitration bus signal ARB<3:0> 130 in order to participate in the arbitration cycle and determine whether the I/O Adapter 20 has successfully won control of the Microchannel system bus 10. The I/O Adapter 20 generates the signal -BURST 132 in order to control the number of DMA cycles before relinquishing control of the Microchannel system bus 10.

Figure 2:
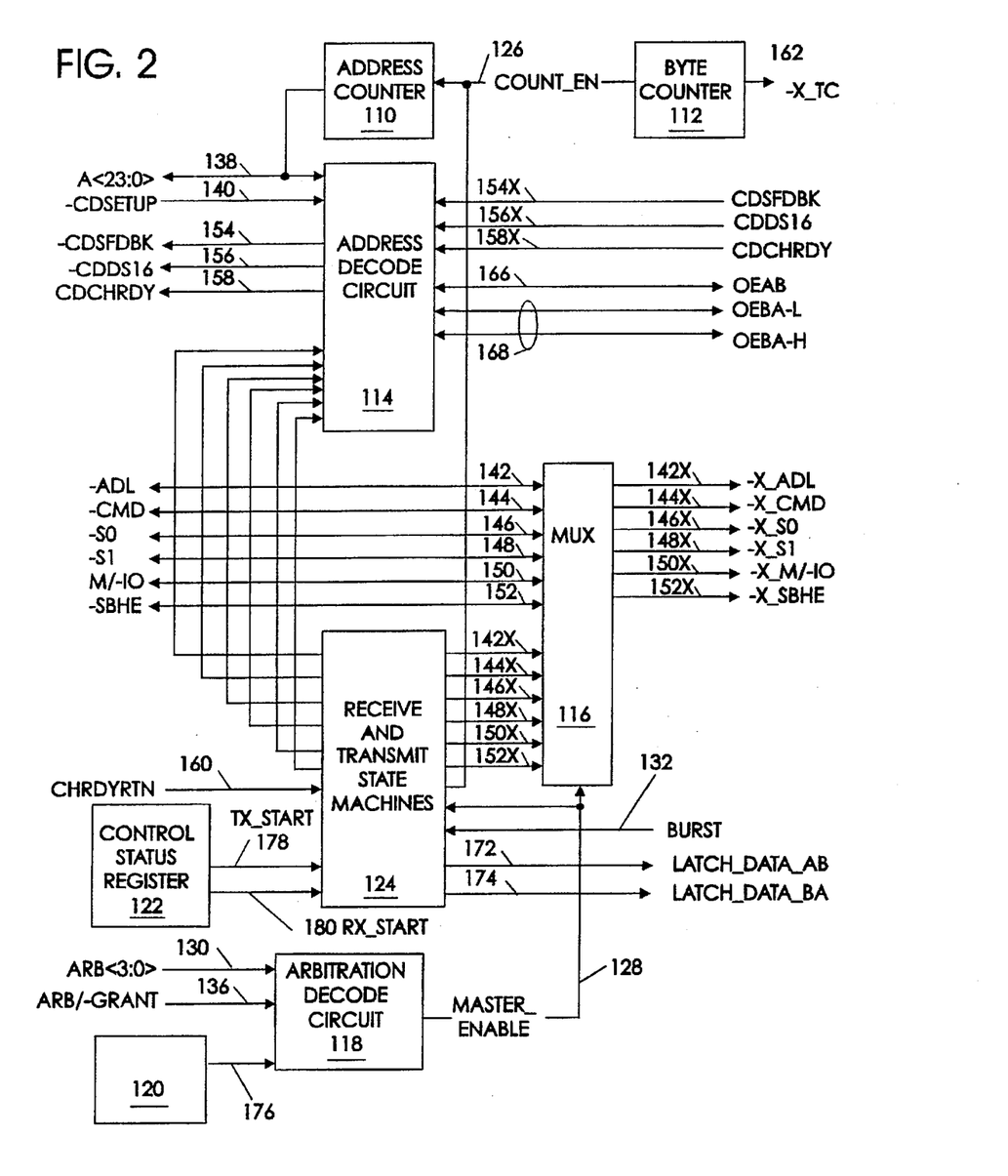
FIG. 2 is a detailed block diagram of the Microchannel DMA Acceleration Device.

Continuing with the description of signals in FIG. 1B, the address is received on A<23:0> 138 by both the DMA Acceleration Device 100 and the I/O Adapter 20 to allow the Microchannel BIOS 54 an access to the various registers on the DMA Acceleration Device 100. During a DMA operation, the DMA Acceleration Device 100 drives these signals with the current value of the Address Counter 110. Both the DMA Acceleration Device 100 and the I/O Adapter 20 monitor the card setup signal -CDSETUP 140, which is an input to the Address Decode Circuit 114. In non-DMA mode, the Microchannel BIOS 54 normally drives an address strobe signal -ADL 142, which is redriven to the I/O Adapter 20 by the DMA Acceleration Device 100 as the address strobe signal -X__ADL 142X. During DMA cycles, however, the Receive and Transmit State Machines 124, as shown in FIG. 2, of the DMA Acceleration Device 100 drive both address strobe signals -ADL 142 and -X__ADL 142X. Similarly, in non-DMA mode, the Microchannel BIOS 54 drives the data strobe signal -CMD 144, which is redriven as the data strobe signal -X__CMD 144X. During DMA cycles, the Receive and Transmit State Machines 124 of the DMA Acceleration Device 100 drive both data strobes signals -CMD 144 and -X CMD 144X. The address strobe and data strobe signals are active when the electrical signals on the address lines and data lines have sufficiently stabilized for accurate reading of the information.

Still continuing with the description of signals in FIG. 1B, in non-DMA mode the Microchannel BIOS 54 drives the write signal -S0 146 and the read signal -S 1 148, which are redriven to the I/O Adapter 20 by the DMA Acceleration Device 100 as the write signal -X__SO 146X and the read signal -X_S 1148X, respectively, in order to differentiate between read and write cycles. The Receive and Transmit State Machines 124 of the DMA Acceleration Device 100 drive all of these signals in the DMA operation. The Microchannel BIOS 54 normally drives the memory or I/O signal M/-IO 150 as it accesses the System Memory 50 or the I/O Adapter 20, and redrives the signal M/-IO 150 as the signal X_M/-IO 150X to access either the System Memory 50 or the I/O Adapter 20. The Receive and Transmit State Machines 124 drive both signals M/-IO 150 and X_M/-IO 150X during DMA cycles. In non-DMA mode, the system bus high enable signal -SBHE 152 is normally driven by the Microchannel BIOS 54 and redriven by the DMA Acceleration Device 100 as the signal -X_SBHE 152X to the I/O Adapter 20 in order to select (in conjunction with the least significant address bit A<0>) either byte or word data size. The Receive and Transmit State Machines 124 of the DMA Acceleration Device 100 drive the signals -SBHE 152 and -X_SBHE 152X during DMA cycles. The I/O Adapter 20 drives the card selected feedback signal the Microchannel BIOS 54 assesses the Microchannel BIOS 54 accesses registers on the I/O Adapter 20. The signal -CDSFDBK 154 is the logical OR of the signal -X_CDSFDBK 154X and the corresponding signal internal to the DMA Acceleration Device 100. The I/O Adapter 20 drives the card data size 16 signal -X_CDDS16 156X if the corresponding register is a 16-bit register. The signal -CDDS16 156 is the logical OR of the signal -X_CDDS16 156X and the corresponding signal internal to the DMA Acceleration Device 100.

Continuing with FIG. 1B, the I/O Adapter 20 drives the card channel ready signal X_CDCHRDY 158X if the I/O Adapter 20 has to extend the access time to an internal register during a bus cycle. A corresponding signal internal to the DMA Acceleration Device 100 is generated to extend the access time to the Control/Status Register 122. The signal CDCHRDY 158 is the logical OR of the signal X_CDCHRDY 158X and the corresponding signal internal to the DMA Acceleration Device 100. The card channel ready return signal CHRDYRTN 160 is monitored by the Receive and Transmit State Machines 124 during DMA cycles in order to determine when the System Memory 50 is ready to complete a DMA cycle. If the System Memory 50 requires an adjustment to the memory access time, the Microchannel BIOS 54 deactivates the card channel ready return signal CHRDYRTN 160 in order to extend the bus cycle for accessing the System Memory 50. The DMA Acceleration Device 100 drives the terminal count -X_TC 162 to the I/O Adapter 20 during the last DMA transfer cycle, as indicated by the Byte Counter 112 reaching a zero count.

Data is driven via the data lines D<15:0> 164 from or to the Microchannel system bus 10 through the Data Latch 115. Normally, either the Microchannel BIOS 54 or the I/O Adapter 20 drives unlatched dam to or from the Microchannel system bus 10, based on the direction of the transfer. During DMA operations, the Dam Latch 115 transfers dam from the System Memory 50 to the I/O Adapter 20, or vice versa. It is a transceiver which drives the dam from the I/O Adapter 20 to the System Memory 50 in a receive mode, and from the System Memory 50 to the I/O Adapter 20 in a transmit mode. When the dam must be placed on the dam lines D<15:0> 164, the output enable signals 166 and 168 are asserted by either the DMA Acceleration Device 100 or the I/O Adapter 20. Loading of dam into the Dam Latch 115 occurs upon assertion of the signal LEAB 170 or the signal LEBA 171, depending on the direction of the dam. The Receive and Transmit State Machines 124 drive and latch the dam during the DMA operation.

FIG. 2 shows more detailed view of the DMA Acceleration Device 100. Its components include the Address Counter 110 containing the address to be placed on the address lines 138 of the Microchannel system bus 10 during DMA transfers. The Microchannel BIOS 54 loads an initial value into the Address Counter 110 during the system initialization. Based on the system configuration, after each successive transfer of data unit, i.e. transfer of a single byte, word, double-word, etc., the signal COUNT_EN 126 from the Receive and Transmit State Machines 124 increments the Address Counter 110 from its initial value to the next address to be read from or written into the System Memory 50. This operation continues each time the signal COUNT_EN 126 is asserted.

Further shown in FIG. 2 is the Byte Counter 112, which is loaded with an initial value by the Microchannel BIOS 54 upon initialization. The Byte Counter 112 keeps track of how many bytes have been transferred and it decrements the count on every transfer using the signal COUNT_EN 126 from the Receive and Transmit State Machines 124. When the Byte Counter 112 reaches zero, it asserts the terminal count signal -X_TC 162 indicating the end of the DMA transfer operation.

In accordance with the invention and as shown in FIG. 2, another component of the DMA Acceleration Device 100 is the Address Decode Circuit 114. The Address Decode Circuit 114 decodes a current bus address on the address lines 138, as well as various control signals to determine whether the Microchannel BIOS 54 wants to access a register on the DMA Acceleration Device 100. The Address Decode Circuit 114 drives the output enable signals 166 and 168 to the Data Latch 115, as well as other control signals on the DMA Acceleration Device 100.

Further in accordance with the invention, a multiplexer MUX 116 selects signals from the two groups of available control signals. The selection is based on the mode of operation of the system. Thus, in a DMA mode of operation, the multiplexer MUX 116 drives the signals from the Receive and Transmit State Machines 124 to the I/O Adapter 20. In a non-DMA mode, however, the multiplexer MUX 116 merely passes the control signals from the Microchannel BIOS 54 to the I/O Adapter 20. Thus, the multiplexer MUX 116 has to select the source of the signals for driving to the I/O Adapter 20. In a non-DMA mode when the DMA Acceleration Device 100 is not active, the address strobe signal -ADL 142, the data strobe signal -CMD 144, the write signal -S0 146, the read signal -S1 148, the memory or I/O signal M/-IO 150, and the system bus high enable signal -SBHE 152 are all redriven to the I/O Adapter 20, as explained in FIG. 1. During a DMA cycle, however, the Receive and Transmit State Machines 124 control the address strobe signal -ADL 142, the data strobe signal -CMD 144, the write signal -S0 146, the read signal -S1 148, the memory or I/O signal M/-IO 150, and the system bus high enable signal -SBHE 152, along with their counterparts -X_ADL 142X, -X_CMD 144X, -X_SO 146X, -X_S1 148X, X_M/-IO 150X and -X_SBHE 152X.

Further in accordance with the invention, during the initialization process, the Microchannel BIOS 54 loads the register 120 with a unique bus identification number assigned to each I/O adapter for arbitration purposes. During the system operation, the Arbitration Decode Circuit 118 receives the contents of the register 120 via the signal 176 and compares the contents with the number received from the Microchannel BIOS 54. If the two numbers match, then the system bus cycle is initiated between the DMA Controller 58 and the I/O adapter 20, where the output from the Arbitration Decode Circuit 118 is the signal MASTER_ENABLE 128 which enables the multiplexer MUX 116. In addition, the signal MASTER_ENABLE 128 is asserted to indicate that the I/O Adapter 20 controls the Microchannel system bus 10. The Receive and Transmit State Machines 124 use the signal MASTER_ENABLE 128 to latch either the signal RX-GO 302 or the signal TX-GO 402, shown in FIGS. 3 and 4, respectively, as determined by the contents of the Control/Status Register 122.

Continuing with the description of signals in FIG. 2, the Control/Status Register 122 enables the Receive and Transmit State Machines 124 by asserting the signals RX_START 180 and TX_START 178. Consequently, a Microchannel BIOS 54 may read from, or write to, the Control/Status Register 122 in order to initiate the corresponding DMA operation.

Figure 3:
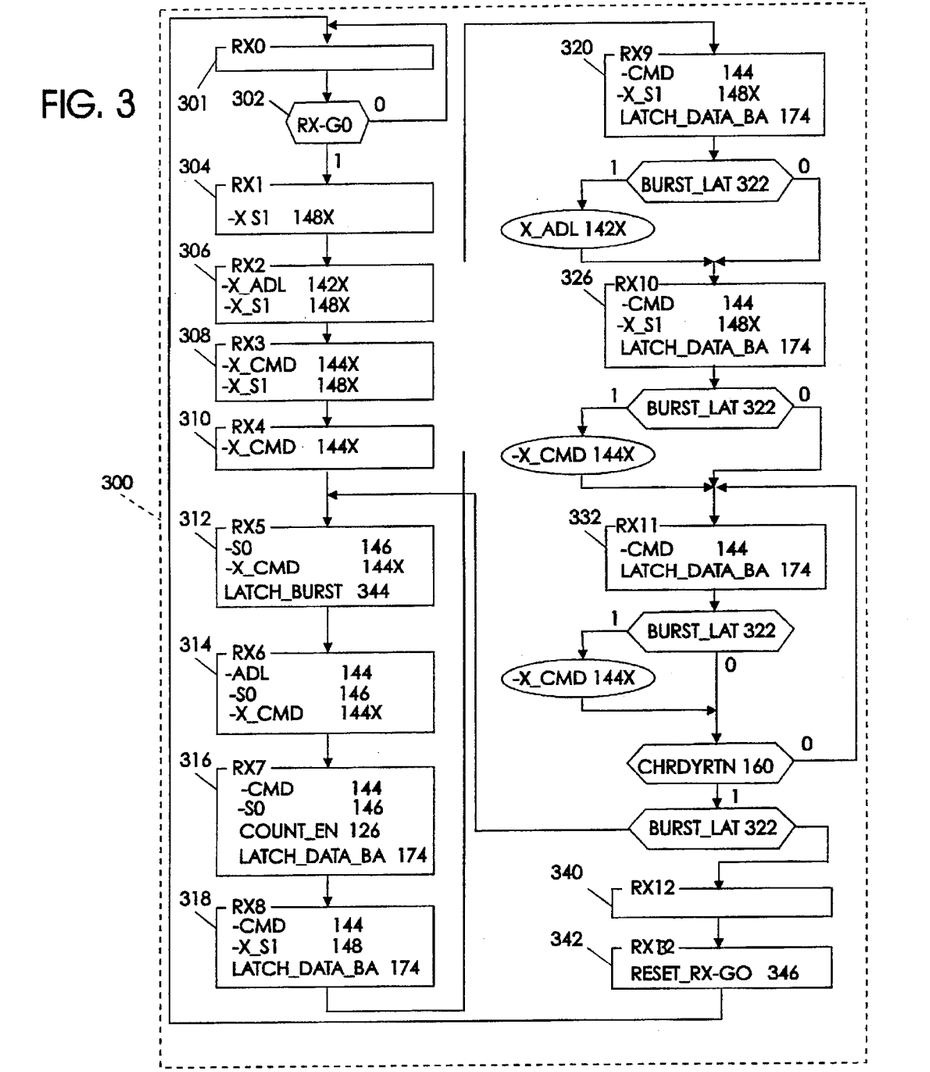
FIG. 3 is a state diagram for the operation of the Receive State Machine in the DMA Acceleration Device.

Further in accordance with the invention, the Receive and Transmit State Machines 124 are described. The Receive and Transmit State Machines 124 are a sequence of instructions for generating signals to control DMA operations, moving data from the I/O Adapter 20 to the System Memory 50 or vice versa. FIGS. 3–6 illustrate the operation of the Receive and Transmit State Machines 124. Referring to FIGS. 3 and 5, each rectangular block has the name of the state in the upper left corner and contains active signals in that state. A diamond-shaped block indicates a decision based on the state of a signal inside the block. An elliptical block contains signals, which are conditionally asserted based on the decision in the preceding diamond-shaped block.

Referring to FIG.S 2 and 3, a description of the input signals to the Receive State Machine 300 follows next. The signal RX-GO 304 is the latched logical AND of the signal MASTER_ENABLE 128 and the signal RX_START 180 from the Control/Status Register 122. Furthermore, the signal BURST_LAT 322 is a latched version of the signal -BURST 132. The signal LATCH_BURST 344, which is an output from the Receive State Machine 300, clocks the signal -BURST 132 into the signal BURST_LAT 322. Another input is the card channel ready return signal CHRDYRTN 160, which is synchronized to the state machine clock. As explained above, the signal CHRDYRTN 160 is used for determining whether the System Memory 50 has completed the current Microchannel DMA cycle.

Still referring to FIGS. 2 and 3, the output signals of the Receive State Machine 300 are -ADL 142, -CMD 144, -S0 146, -S1 148, M/-IO 150, -SBHE 152,-X_ADL 142X, -X_CMD 144X, -X_SO 146X, -X_S1 148X, X_M/-IO 150X, -X_SBHE 152X and COUNT_EN 126, as described in the preceding portions of the specification. Another output signal of the Receive State Machine 300 is the signal LATCH_DATA_BA 174 driving the signal LEBA 171, which controls the loading of data into the Data Latch 115. When the signal LATCH_DATA_BA 174 is active, the data from the I/O Adapter 20 is latched into the Data Latch 115. Another output signal is the LATCH_BURST 344, which controls latching of the signal -BURST 132 in the flip-flop BURST_LAT 328. The data is latched on the clock edge following the assertion of the signal LATCH_BURST 344. Still another output signal is the RESET_RX-GO 346, which resets the signal RX-GO 302 upon completion of the DMA transfer operation.

The state diagram in FIG. 3 illustrates the operation of the Receive State Machine 300. When RX-GO 302 is inactive, the Receive State Machine 300 remains in an idle state RX0 301. Upon receiving the signal RX-GO 302, the Receive State Machine 300 moves to the state RX1 304. The signal RX-GO 302 indicates that the I/O Adapter 20 has gained control of the Microchannel system bus 10 and started the DMA receive operation. In the state RX1 304, the read signal -X_S1 148X is asserted in preparation of the read operation from the I/O Adapter 20. Next, in the state RX2 306, the Receive State Machine 300 asserts the address strobe signal -X_ADL 142X, while still holding the read signal -X_S1 148X active.

In the state RX3 308, the Receive State Machine 300 releases the address strobe signal -X_ADL 142X and asserts the data strobe signal -X_CMD 144X, while continuing to hold the read signal -X_S1 148X active.

In the state RX4 310, the Receive State Machine 300 deasserts the read signal -X_S1 148X while still holding active the data strobe -X_CMD 144X, which is the protocol dictated by the Microchannel bus architecture due to its minimum bus cycle time for strobing dam. Thus, at the state RX4 310, the data strobe signal -X_CMD 144X is still asserted in order to get the data out of the I/O Adapter 20.

The state RX5 312 still finds the Receive State Machine 300 in the middle of transferring data from the I/O Adapter 20, as evidenced by the active data strobe signal -X_CMD 144X. In this state, however, the Receive State Machine 300 has started the operation on the Microchannel system bus 10 in parallel with the continuing I/O Adapter 20 operation. Thus, the Receive State Machine 300 asserts the write signal -S0 146 for transferring the data to the System Memory 50. Also in this state, the signal -BURST 132 from the I/O Adapter 20 is latched by the signal LATCH_BURST 344.

In the state RX6 314, the Receive State Machine 300 continues with the Microchannel system bus 10 operation by holding the write signal -S0 146 and asserting the address strobe signal -ADL 142 to the Microchannel system bus 10, while continuing to hold the data strobe -X_CMD 144X to the I/O Adapter 20.

In the state RX7 316, the Receive State Machine 300 continues holding the write signal -S0 146 and also asserts the data strobe signal -CMD 144 to the Microchannel system bus 10 for writing the data to the System Memory 50. In this state, the Receive State Machine 300 latches the data from the I/O Adapter 20 into the Data Latch 115 by asserting the signal LATCH_DATA_BA 174. Therefore, the Receive State Machine 300 terminates its operation with respect to the I/O Adapter 20 and starts the data portion of the cycle on the Microchannel system bus 10. Also in this state, the signal COUNT_EN 126 decrements the Byte Counter 112 while also incrementing the Address Counter 110.

The state RX8 318 proceeds with the Microchannel bus operation by continuing the data transfer via the data strobe signal -CMD 144 and the signal LATCH_DATA_BA 174, while simultaneously starting the next read operation from the I/O Adapter 20 by asserting the read strobe -X_S1 148X to the I/O Adapter 20.

The state RX9 320 continues transferring data on the Microchannel system bus 10, as again indicated by the assertion of the data strobe signal -CMD 144 and the signal LATCH_DATA_BA 174. In addition, the Receive State Machine 300 examines the signal BURST_LAT 322 to determine whether the control of the Microchannel system bus 10 should be relinquished after the current transfer. If the signal BURST_LAT 322 is asserted, then another data transfer will follow, and the Receive State Machine 300 initiates reading this data from the I/O Adapter 20 by asserting the address strobe signal -X_ADL 142X.

The state RX10 326 then continues this process. The data is still latched via the signal LATCH_DATA_BA 174, and the data strobe signal -CMD 144 is still asserted on the Microchannel system bus 10. If this is not the last transfer, i.e., the signal BURST_LAT 322 is active, then the Receive State Machine 300 continues with the transfer of data from the I/O Adapter 20 by asserting data strobe -X_CMD 144X. If, however, the signal BURST_LAT 322 contains zero, then the cycle in progress on the Microchannel system bus 10 is the last transfer cycle.

In the state RX11 332, the Receive State Machine 300 continues holding the latched data via the signal LATCH_DATA_BA 174 and asserting the data strobe -CMD 144 to the Microchannel system bus 10. If the signal BURST_LAT 322 is asserted, then the data strobe signal -X_CMD 144X is also held active. Next, if the card channel ready return signal CHRDYRTN 160 contains logical one, meaning that the System Memory 50 has completed the write cycle, the Receive State Machine 300 then transitions to the next state based on the value of the signal BURST_LAT 322. If it is the last DMA transfer cycle, as indicated by the signal BURST_LAT 322 being a logical zero, the Receive State Machine 300 then transitions to the state RX12 340, which is a wait state before the state RX13 342. In the state RX13 342, the current DMA transfer is terminated, and the Receive State Machine 300 resets the signal RX_GO 302, in preparation for the next DMA transfer, by asserting the signal RESET_RX_GO 346 and returning to the idle state RX0 301.

If the card channel ready return signal CHRDYRTN 160 is zero in the state RX11 332, meaning that the System Memory 50 has not completed the write cycle yet, the Receive State Machine 300 then stays in the state RX11 332 until the card channel ready return signal CHRDYRTN 160 becomes active. Once the System Memory 50 has completed the write cycle and provided the signal BURST_LAT 322 contains a logical one, meaning it is not the last DMA transfer cycle, then after the state RX11 332, the Receive State Machine 300 goes to the state RX5 312 and continues to perform the Microchannel portion of the cycle.

Finally, after the state RX11 332, the Receive State Machine 300 goes either to the state RX5 312 and continues to perform the microchannel portion of the cycle, or to the states RX12 340 and RX13 342 for termination of the current DMA transfer.

The operation of the Receive State Machine 300 can be further understood from FIG. 5. FIG. 5 is a timing diagram for a typical Microchannel DMA transfer using the DMA Acceleration Device 100 during the receive operation, where the data transfer is from the I/O Adapter 20 to the System Memory 50. Since the data movement is from the I/O Adapter 20 to the System Memory 50, in the state RX1 304, the read signal -X_S1 148X is asserted to the I/O Adapter 20. Then in the state RX2 306, the address strobe signal -X_ADL 142X is asserted to the I/O Adapter 20, and in the state RX3 308 the data strobe signal -X_CMD 144X is active while the data D(n) is read from the I/O Adapter 20. Therefore, in the first three states of the Receive State Machine 300, the data is read from the I/O Adapter 20. In the state RX4 310, the Receive State Machine 300 continues reading the data D(n). The transfer of data D(n) to the Microchannel system bus 10 is initiated by asserting the write signal -S0 146 in the state RX5 312 and the address strobe signal -ADL 142 in the state RX6 314. In the state RX7 316, the data D(n) previously read from the I/O Adapter 20 is now written into the System Memory 50 by having the Receive State Machine 300 assert the data strobe signal -CMD 144. The writing of the data to the System Memory 50 continues in the states RX8 318, RX9 320, RX10 326 and RX11 332, while the subsequent data unit is read from the I/O Adapter 20. After the state RX11 332, assuming another data unit must be transferred during the current DMA operation, the Receive State Machine 300 goes back to the state RX5 312, and the process continues as described above. The operation in the states RX5 312 through RX11 332 is repeated until the I/O Adapter 20 pulls the signal -BURST 132 high, indicating that the last data unit has been transferred during the current operation.

Figure 4:
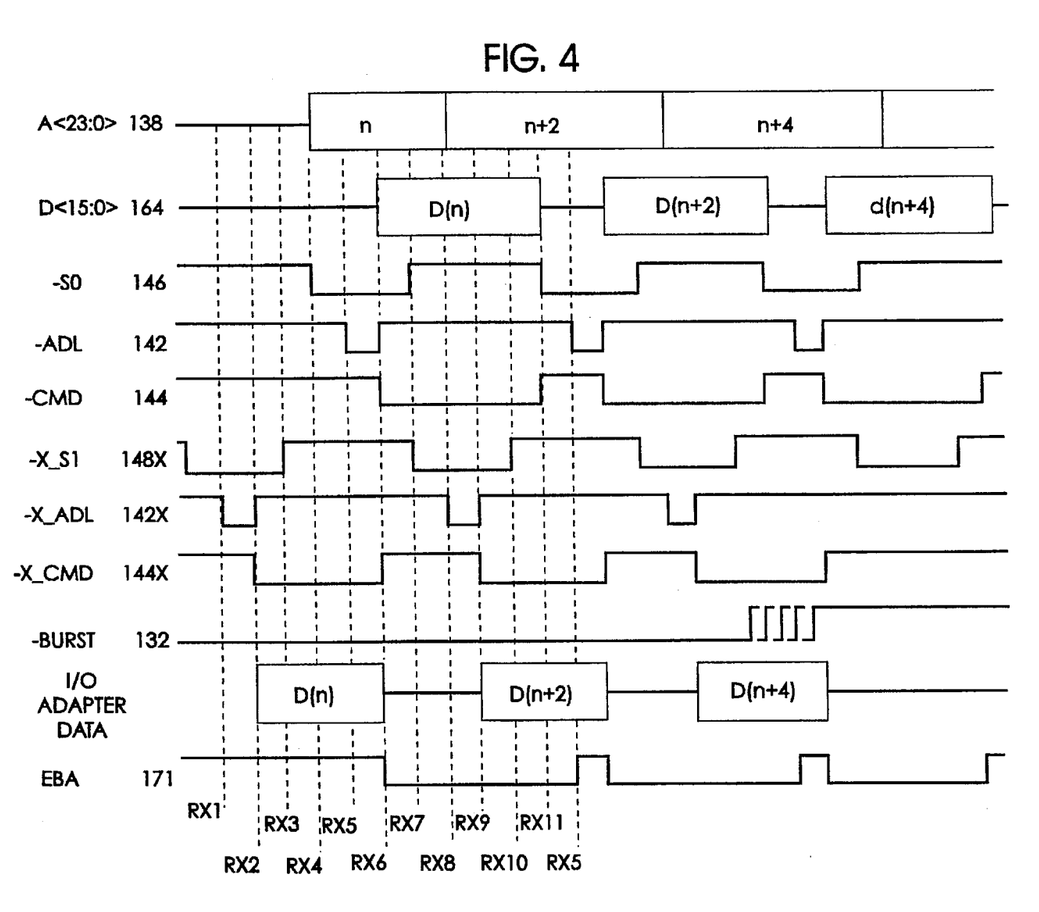
FIG. 4 is a timing diagram for a typical Microchannel DMA transfer using the DMA Acceleration Device during the receive operation, where the data is transferred from the I/O Adapter to the system memory.
Figure 5:
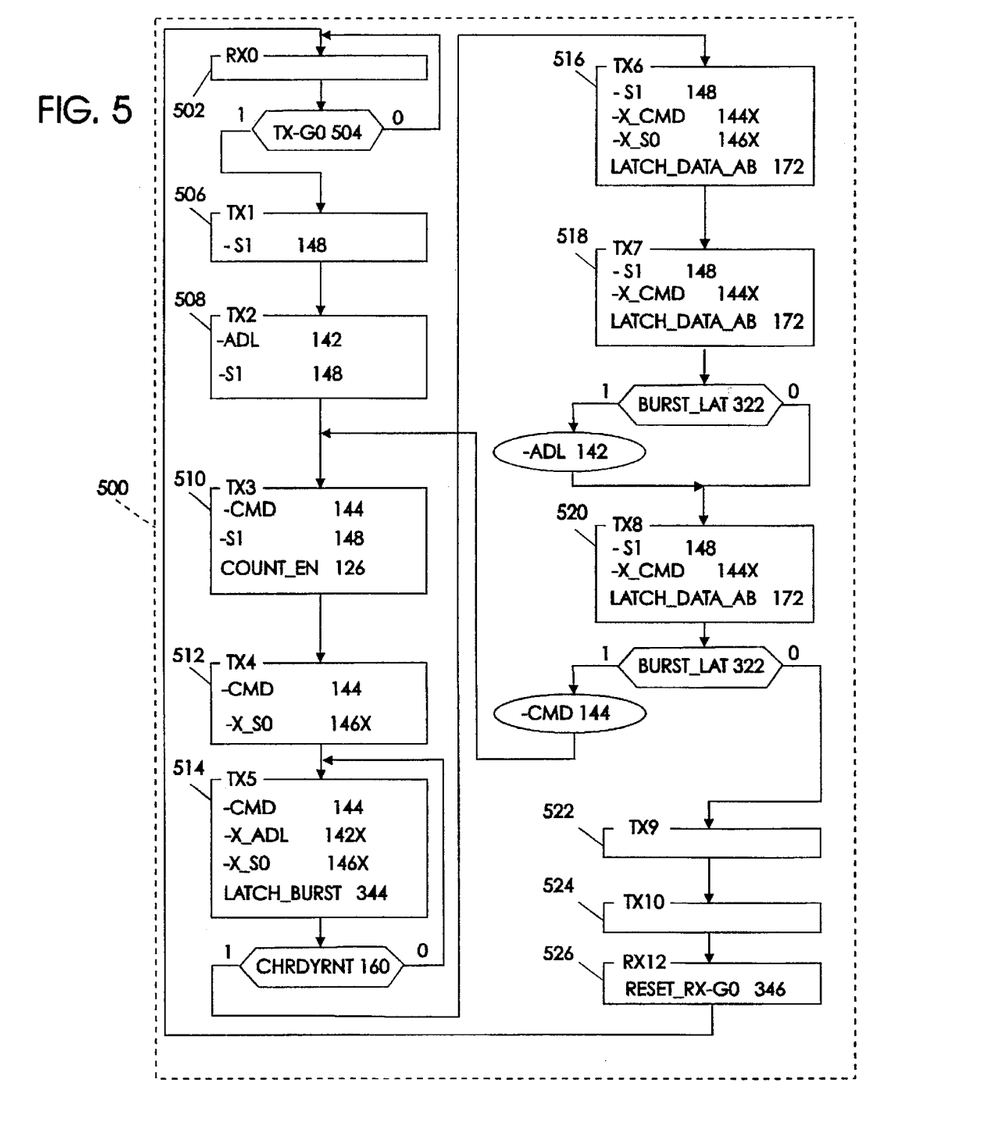
FIG. 5 is a state diagram for the operation of the Transmit State Machine in the DMA Acceleration Device.

As easily appreciated from the timing diagram of FIG. 4, the reading of data from the I/O Adapter 20 and then its writing to the System Memory 50 occur in parallel with each other. Since the Receive State Machine 300 starts the write operation on the Microchannel system bus 10 prior to its completion of the read operation from the I/O Adapter 20, the throughput of data is increased by a factor of two.

Next, FIG. 5 shows the operation of the Transmit State Machine 500. Referring to FIGS. 2 and 5, the description of input signals to the Transmit State Machine 500 is as follows. The signal TX-GO 504 is the latched logical AND of the signal MASTER_ENABLE 128 and the signal TX_START 178 from the Control/Status Register 122. Next, the signal BURST_LAT 322 is a latched version of the signal -BURST 132. The signal LATCH_BURST 344 is an output from the Transmit State Machine 500 which clocks the signal -BURST 132 into the signal BURST_LAT 322. Another input is the signal CHRDYRTN 160 which is synchronized to the state machine clock. As explained above, the signal CHRDYRTN 160 is used for determining whether the System Memory 50 has completed the Microchannel DMA cycle.

Referring to FIGS. 2 and 5, all except two of the output signals are identical to the output signals of the Receive State Machine 300 as shown in FIG. 3. Referring to FIGS. 2 and 5, the output signals of the Transmit State Machine 500, which are identical to the outputs from the Receive State Machine 300, are -ADL 142, -CMD 144, -S0 146, -S1 148, M/-IO 150, -SBHE 152, -X_ADL 142X, -X_CMD 144X, -X_S0 146X, -X_S1 148X, X_M/-IO 150X, -X_SBHE 152X, COUNT_EN 126, LATCH_BURST 344 and BURST_LAT 322. These signals are described in the preceding portions of the specification. Two signals, which are different from the signals of the Receive State Machine 300, are LATCH_DATA_AB 172 and RESET_TX-GO 528. The signal LATCH_DATA_AB 172 drives the signal LEAB 170, which controls loading of data into the Data Latch 115. When the signal LATCH_DATA_AB 172 is active, the data from the System Memory 50 is latched into the Data Latch 115. With respect to the signal RESET_TX-GO 528, upon completing the DMA transfer, the signal RESET_TX-GO 528 resets the signal TX-GO 504 in preparation for the new DMA transfer.

The state diagram in FIG. 5 shows the operation of the Transmit State Machine 500. When inactive, the Transmit State Machine 500 remains in an idle state TX0 502. Upon receiving the signal TX-GO 504, the Transmit State Machine 500 moves to the state TX1 506 to start the Microchannel portion of the cycle. Data is now moving from the Microchannel system bus 10 to the I/O Adapter 20.

In the state TX1 506, the Transmit State Machine 500 asserts the read signal -S1 148 in order to read the data from the System Memory 50.

In the state TX2 508, the Transmit State Machine 500 asserts the address strobe signal -ADL 142 while still holding the read signal -S1 148 active.

In the state TX3 510, the Transmit State Machine 500 asserts the data strobe signal -CMD 144 and releases the address strobe signal -ADL 142, while holding the read signal -S1 148 active. The data is now read from the System Memory 50, and also at this point, the signal COUNT_EN 126 increments the Address Counter 110 while also decrementing the Byte Counter 112.

Then, in the state TX4 512, the Transmit State Machine 500 continues with the data transfer via the data strobe signal -CMD 144, and in addition, initiates the process of writing to the I/O Adapter 20 by asserting the write signal -X_SO 146X.

Next, in the state TX5 514, the Transmit State Machine 500 continues to assert the data strobe -CMD 144 to the Microchannel system bus 10 and activates the address strobe -X_ADL 142X to the I/O Adapter 20, while testing the channel ready return signal CHRDYRTN 160. The Transmit State Machine 500 stays in the state TX5 514 until the channel ready return signal CHRDYRTN 160 is asserted, and the Transmit State Machine 500 can then transition to the state TX6 516.

In the state TX6 516, the data strobe -CMD 144 on the Microchannel system bus 10 is deasserted. At this point, the data is latched into the Data Latch 115 using the signal LATCH_DATA_AB 172, and the Transmit State Machine 500 can now start writing the data to the I/O Adapter 20 by asserting the data strobe -X_CMD 144X.

In the state TX7 518, the Transmit State Machine 500 continues writing the data to the I/O Adapter 20 via the data strobe signal -X_CMD 144X and the signal LATCH_DATA_AB 172. The Transmit State Machine 500 checks the signal BURST_LAT 322 to determine whether the current cycle is the last cycle in the DMA transfer. If another DMA cycle will follow, then the Transmit State Machine 500 asserts the address strobe -ADL 142 on the Microchannel system bus 10 for another read operation.

Then, in the state TX8 520, the Transmit State Machine 500 again checks the signal BURST_LAT 322. If another DMA cycle will follow, the Transmit State Machine 500 asserts the data strobe signal -CMD 144 on the Microchannel system bus 10 for another read operation, and the state TX4 512 will be the next state. If, on the other hand, it is the last DMA cycle, then the Transmit State Machine 500 goes to the wait states TX9 522 and TX10 524 to simply create some temporal buffering for its operation. Then, in the state TX11 528, the Transmit State Machine 500 resets the signal TX-GO 504 by asserting the signal RESET_TX-GO 528, in preparation for the new DMA transfer, and goes back to the idle state TX0 502.

Figure 6:
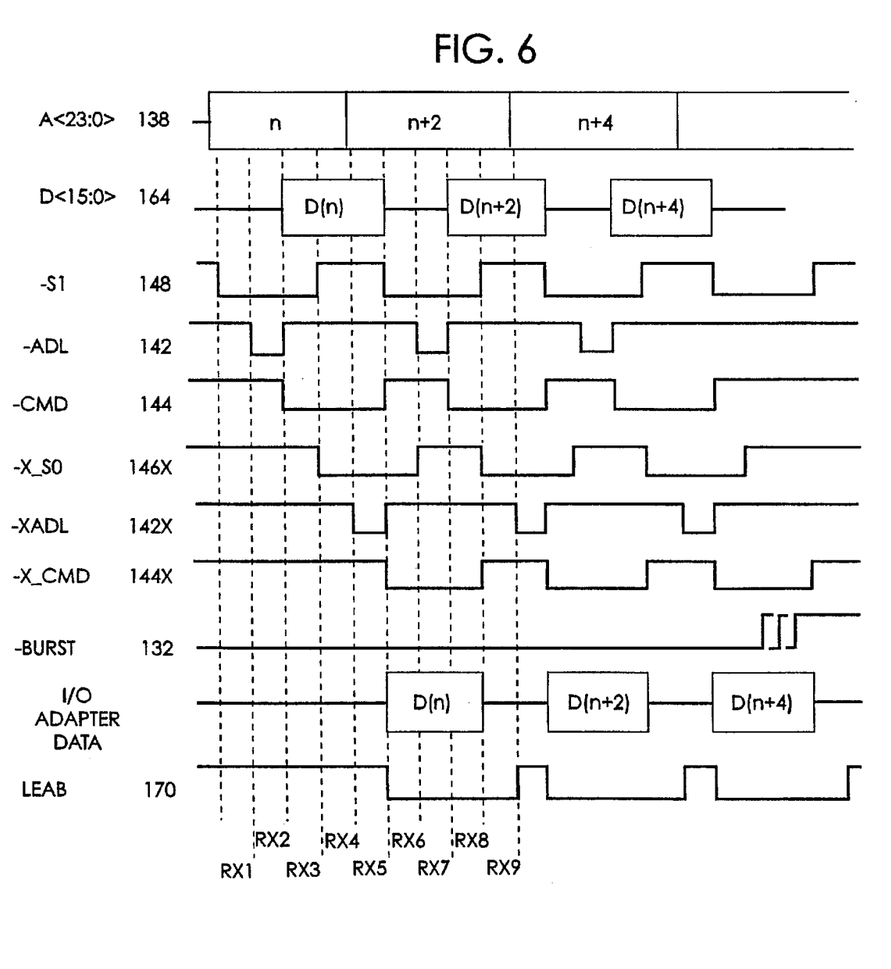
FIG. 6 is a timing diagram for a typical Microchannel DMA transfer using the DMA Acceleration Device during the transmit operation, where the data is transferred from the system memory to the I/O Adapter.

The operation of the Transmit State Machine 500 can be further understood from FIG. 6. FIG. 6 is a timing diagram for a typical Microchannel DMA operation using the DMA Acceleration Device 100 during the transmit operation, where the data transfer occurs from the System Memory 50 to the I/O Adapter 20. Since the data moves from the System Memory 50 to the I/O Adapter 20, in the state TX1 506 the read signal -S1 148 becomes active on the Microchannel system bus 10. Then in the state TX2 508, the address strobe signal -ADL 142 is asserted, and in the state TX3 510 the data strobe signal -CMD 144 becomes active on the Microchannel system bus 10 while the data D(n) is read from the System Memory 50. Thus, in the first three states of the Transmit State Machine 500, the data is read from the System Memory 50. In the state TX4 512, the Transmit State Machine 500 continues to read the data D(n). At this time, however, the transfer of data D(n) to the I/O Adapter 20 is initiated by asserting the write signal -X_SO 146X in the state TX4 512 and the address strobe signal -X_ADL 142X in the state TX5 514 to the I/O Adapter 20. Then, in the state TX6 516, the data D(n) is strobed by the signal -X_CMD 144X into the Data Latch 115 for subsequent transfer to the I/O Adapter 20, as shown by the signal LEAB 170. While the data D(n) is being latched into the Data Latch 115, another operation is started on the Microchannel system bus 10, as demonstrated by the active address strobe -ADL 142 in the state TX7 518, provided another DMA transfer will follow as indicated by the active signal -BURST 132. In the state TX8 520, the new data D(n+2) is read from the System Memory 50 while the previous data D(n) is transferred to the I/O Adapter 20. The process is repeated in the states TX4 512 through TX8 520, until the signal -BURST 132 becomes high, indicating the end of the DMA transfer cycle.

As easily appreciated from the timing diagram of FIG. 6, the reading of data from the System Memory 50 and then its writing to the I/O Adapter 20 occur in parallel with each other. Since the Transmit State Machine 500 starts the subsequent read operation on the Microchannel system bus 10 prior to its completion of the current write operation to the I/O Adapter 20, the throughput of data is increased by a factor of two in direct analogy to the receive operation.

Figure 7:
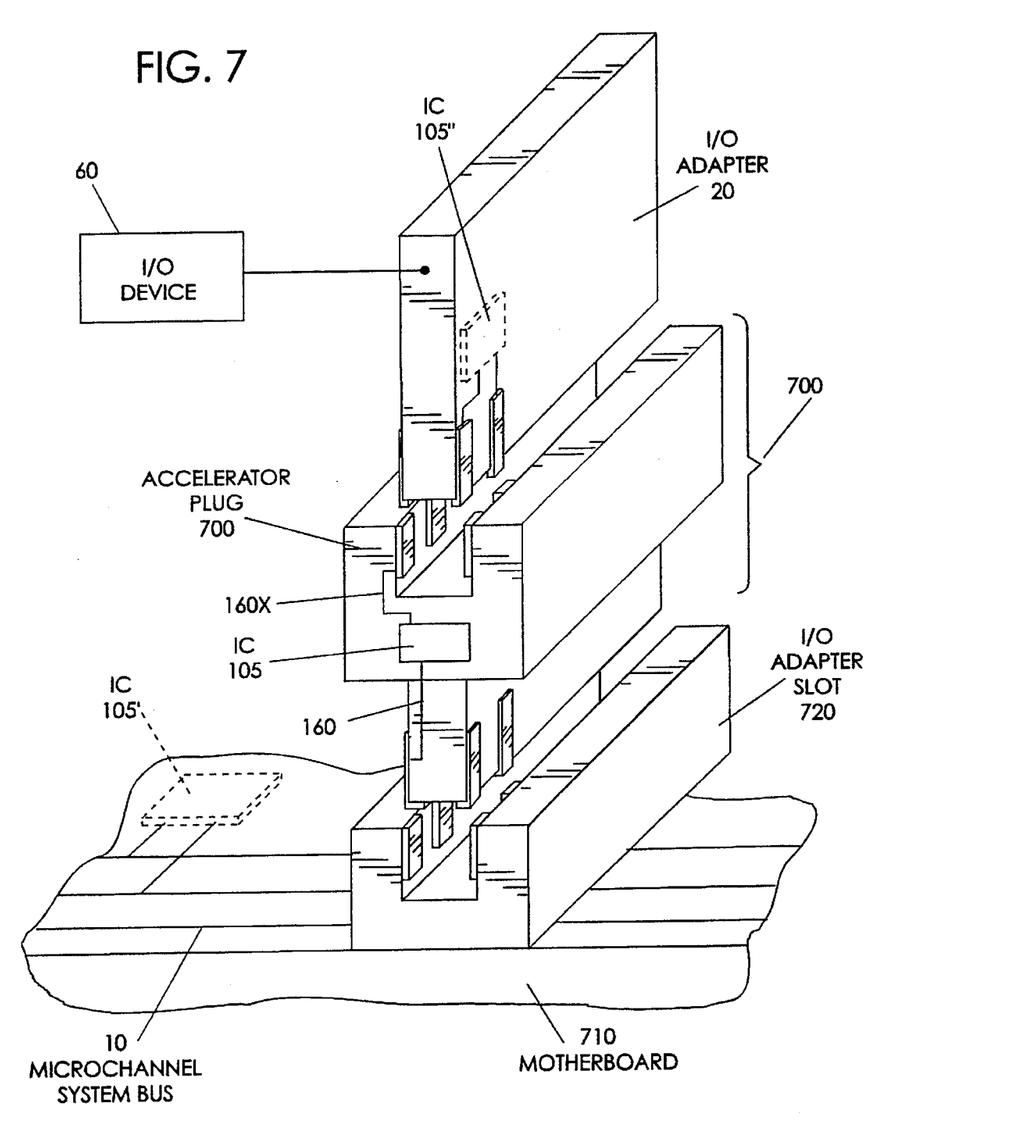
FIG. 7 illustrates various positions of the integrated circuit comprising the DMA Acceleration Device coupled between the system bus and the I/O means.

Further in accordance with the invention, FIG. 7 illustrates various positions of the IC 105 comprising the DMA Acceleration Device 100 and the Data Latch 115, as shown in FIG. 1B. The IC 105 is coupled between the system bus 10 and the I/O Device 60 via the I/O Adapter 20 using various configurations as described below.

Referring to FIG. 7, in one embodiment of the invention, the IC 105 may be embedded into the Accelerator Plug 700. The Accelerator Plug 700 accepts the I/O Adapter 20 and is also inserted into the I/O Adapter Slot 720, coupled to the Microchannel system bus 10 on the Motherboard 710.

Still referring to FIG. 7, in another embodiment of the invention, the IC 105 may be attached to the Motherboard 710, while being connected to the Microchannel system bus 10. The I/O Device 60 via the I/O Adapter 20 is inserted into the I/O Adapter Slot 720 to be connected to the IC 105', as shown in FIG. 7.

In yet another embodiment of the invention, the IC 105", being connected to the I/O Device 60, is positioned on the I/O Adapter 20, which is inserted into the I/O Adapter Slot 720 for coupling with the Microchannel system bus 10.

Although a specific embodiment of the invention has been disclosed in a setting of the Microchannel bus architecture, the DMA Acceleration Device 100 will equally apply to other data processing systems using bus arbitration schemes in a data transfer operation.

Since those skilled in the art can modify the disclosed specific embodiment without departing from the spirit of the invention, it is, therefore, intended that the claims be interpreted to cover such modifications and equivalents.

What is claimed is:

1. A device for increasing a data transfer rate between a system bus and an input/output adapter during a direct memory access operation, comprising:

bus arbitration means coupled to the system bus and the input/output adapter, for decoding bus arbitration signals from the system bus and the input/output adapter, and gaining control of the system bus for the direct memory access operation when a signal bearing a predefined code corresponding to the input/output adapter is detected;

addressing means coupled to the system bus and the input/output adapter, for supplying an address to the system bus and the input/output adapter when said bus arbitration means has gained control of said system bus, and sequencing means coupled to the system bus and the input/output adapter, wherein said sequencing means causes a sequence of instructions to be executed for generating control signals that simultaneously initialize for a transfer of new data over the system bus and cause transmission of data between the system bus and the input/output adapter according to current addresses produced by said addressing means.

2. The device according to claim 1, further comprising a data storage means coupled to said sequencing means, for providing temporal delay to stabilize the data in response to the control signals from said sequencing means.

3. The device according to claim 2, wherein said bus arbitration means comprises a register for holding a bus identification number assigned to the input/output adapter and an arbitration decode circuit coupled to said register and the system bus, for comparing said bus identification number with a number received from the system bus.

4. The device according to claim 1, wherein said system bus connects to a system memory and said addressing means comprises an address counter coupled to the system bus for producing data addresses for accessing said memory, said address counter being loaded with an address which is incremented during the direct memory access operation, and an address decode circuit coupled to the system bus, for decoding the control signals to select the input/output adapter for the direct memory access operation.

5. The device according to claim 1, wherein said sequencing means comprises receive and transmit state machines for generating the control signals during the direct memory access operation, said receive and transmit state machines being programmed to read and write data in parallel with a host processor.

6. The device according to claim 5, wherein said receive state machine comprises a sequence of instructions for reading data from the input/output adapter in parallel with the host processor writing data to a system memory during a receive operation.

7. The device according to claim 5, wherein said transmit state machine comprises a sequence of instructions for writing data to the input/output adapter in parallel with reading data from a system memory during a transmit operation.

8. A device for increasing a data transfer rate between a system bus and an input/output adapter during a direct memory access operation, comprising:

an address counter coupled to the system bus for maintaining an address of a system memory, wherein a host processor loads said address counter with an initial address, wherein said initial address is incremented during the direct memory access operation;

a byte counter coupled to the system bus for counting data to be transferred during the direct access memory operation;

an address decode circuit coupled to the system bus for decoding control signals in order to select the input/output adapter for the direct memory access operation;

receive and transmit state machines coupled to the system bus and the input/output adapter, for generating the control signals during the direct memory access operation, said receive and transmit state machines being programmed to read and write data in parallel between the system bus and the input/output adapter;

a control/status register coupled to the system bus, for enabling said receive and transmit state machines in response to a request by the host processor, a multiplexer coupled to the system bus, for selecting plurality of control signals to be driven to the input/output adapter;

a register coupled to the system bus, for holding a bus identification number assigned to the input/output adapter;

an arbitration decode circuit coupled to the system bus, for comparing said bus identification number with a number received from the system bus; and data storage means coupled to said state machines, for providing temporal delay to stabilize data in response to the control signals from said receive and transmit state machines.

9. A method for increasing a data transfer rate between a system bus and an input/output adapter during a direct memory access receive operation, comprising:

starting a receive state machine, wherein a first control signal initiates data transfer from the input/output adapter to the system bus;

reading a data unit from the input/output adapter by the receive state machine;

writing said data unit to the system bus while simultaneously initializing addressing for reading another data unit subsequent to said data unit being written to the system bus from the input/output adapter;

sequentially repeating said step of reading a data unit units from the input/output adapter and the step of writing of said data units to the system bus while simultaneously initializing addressing for reading another data unit subsequent to said data unit being written to the system bus from the input/output adapter; and stopping said receive state machine, wherein a second control signal concludes the data transfer from the input/output adapter to the system bus.

\* \* \* \* \*